(12) United States Patent
Ramamurthy (10) Patent No.: US 7,637,107 B2
(45) Date of Patent: Dec. 29, 2009

(54) ENGINE BACKPRESSURE COMPENSATION SYSTEM FOR STABLE EMISSIONS

(75) Inventor: Ravishankar Ramamurthy, Westland, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 158 days.

(21) Appl. No.: 11/459,382

(22) Filed: Jul. 24, 2006

(65) Prior Publication Data
US 2008/0016865 A1 Jan. 24, 2008

(51) Int. Cl.
*F02B 33/44* (2006.01)
(52) U.S. Cl. ...................................... 60/611
(58) Field of Classification Search ............... None
See application file for complete search history.

(56) References Cited

U.S. PATENT DOCUMENTS

| | | | |
|---|---|---|---|
| 2,067,800 A * | 1/1937 | Stockton | 210/381 |
| 5,050,572 A * | 9/1991 | Tamekiyo | 123/564 |
| 6,652,414 B1* | 11/2003 | Banks, III | 477/32 |
| 6,662,562 B2* | 12/2003 | Engel et al. | 60/602 |
| 6,968,689 B2* | 11/2005 | Bleile et al. | 60/612 |
| 2005/0000216 A1* | 1/2005 | Bleile et al. | 60/611 |
| 2006/0016196 A1* | 1/2006 | Epstein | 60/773 |
| 2006/0016197 A1* | 1/2006 | Epstein | 60/773 |
| 2006/0288701 A1* | 12/2006 | Ramamurthy et al. | 60/602 |
| 2007/0068147 A1* | 3/2007 | Sun et al. | 60/297 |
| 2007/0068171 A1* | 3/2007 | Epstein | 60/792 |
| 2007/0119172 A1* | 5/2007 | Barbe et al. | 60/605.2 |
| 2007/0234985 A1* | 10/2007 | Kolmanovsky | 123/90.15 |
| 2007/0235005 A1* | 10/2007 | Lewis | 123/322 |

* cited by examiner

*Primary Examiner*—Thomas Denion
*Assistant Examiner*—Douglas J. Duff (57) ABSTRACT

A control system and method that compensates for changes in backpressure of an engine includes a pressure sensor that senses the backpressure. A boost compensation module that communicates with the pressure sensor, determines an averaged BC factor, and adjusts a variable geometry turbo based on the averaged BC factor.

20 Claims, 6 Drawing Sheets

ENGINE BACKPRESSURE COMPENSATION SYSTEM FOR STABLE EMISSIONS

FIELD OF THE INVENTION

The present invention relates to diesel engines, and more particularly to maintaining stable emissions of diesel engines.

BACKGROUND OF THE INVENTION

Diesel engine operation involves combustion that generates exhaust gas. During combustion, an air/fuel mixture is delivered through an intake valve to cylinders and is combusted therein. Air flow delivered to the cylinders can be measured using a mass air flow (MAF) sensor. The MAF sensor measures the total intake fresh air flow through the air induction system. After combustion, the piston forces exhaust gas in the cylinders into an exhaust system. The exhaust gas may contain various emission components including diesel particulates or soot.

A diesel particulate filter (DPF), usually disposed in the exhaust stream, can be used to reduce the level of soot in the exhaust gas. As soot accumulation increases within the DPF, pressure increases inside the DPF which increases backpressure (BP) within the engine. An increase in BP may result in a loss of air flow to the engine. A variable geometry turbo (VGT) is employed to compensate for the loss in air flow by controlling the intake manifold pressure (boost) to the engine. The VGT has moveable vanes that are located in the turbine housing and that enable the VGT to control boost by managing exhaust turbine inlet pressure. As BP increases, an increasingly greater amount of boost may be required to maintain engine operation at specific conditions.

Over time, the DPF becomes full of soot and is regenerated to remove the trapped diesel particulates. During regeneration, the diesel particulates are burned within the DPF to renew the filtering function of the DPF.

Engine systems often include an exhaust gas recirculation (EGR) system to reduce engine emissions. EGR involves re-circulating exhaust gases back into the cylinders, which reduces the amount of oxygen available for combustion and lowers cylinder temperatures. For exhaust gas to flow into the intake manifold, exhaust pressure must be greater than the intake manifold pressure (boost). An EGR system enables ignition timing to remain at an optimum point, which improves fuel economy and/or performance. However, debris build-up within the EGR system may restrict exhaust flow there through and minimize the effectiveness of the EGR system. In addition, as BP increases the EGR mass flow may need to be reduced to maintain performance.

SUMMARY OF THE INVENTION

A control system and method that compensates for changes in backpressure (BP) of an engine includes a pressure sensor that senses the BP. A boost compensation (BC) module communicates with the pressure sensor, determines an averaged BC factor, and adjusts a variable geometry turbo (VGT) based on the averaged BC factor. A monitoring module controls the VGT based on a compensation ratio that represents a rate of change of intake manifold pressure relative to the rate of change of vane position of the VGT. The monitoring module commands the BC module to stop adjusting the VGT when the compensation ratio begins to decrease.

In other features, an air flow compensation (AFC) module determines an averaged AFC factor and adjusts an exhaust gas recirculation (EGR) valve based on the averaged AFC factor. The exhaust gas recirculation (EGR) valve the controls recirculation of exhaust gas into an intake manifold.

In still other features, the BC module determines a BC factor based on a first SP ratio and a first engine operation point and the AFC module determines an ARC factor based on a second BP ratio and a second engine operation point. The BC module calculates the first BP ratio based on a first averaged BP value relative to a first reference BP value at said first engine operation point and the AFC module calculates the second BP ratio based on a second averaged BP value relative to a second reference BP value at said second engine operation point. The first reference BP value and the second reference BP value are determined from a reference BP diesel particulate filter table, the BC factor is determined from a BC curve, and the AFC factor is determined from an AFC curve.

In still other features, the BC curve and the AFC curve can be calibrated.

In still other features, a time averaged filter module controls positioning of the EGR valve.

In still other features, the control system and method cease operation when the DPF switches to a regeneration mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
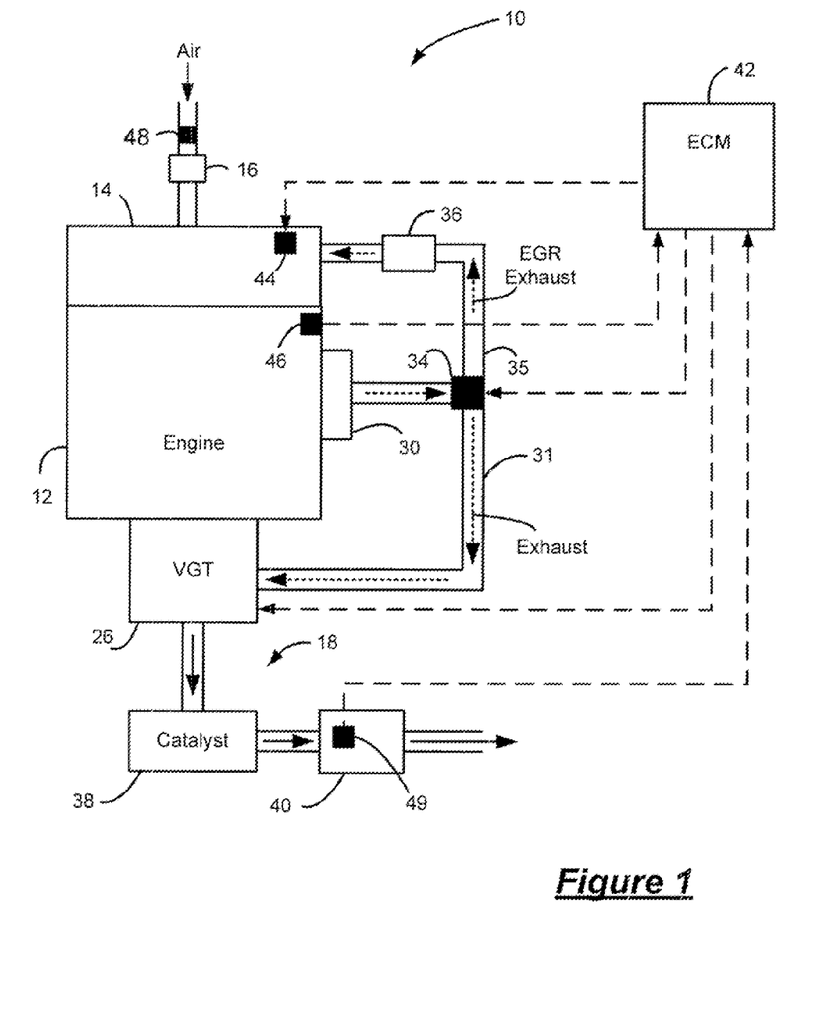
FIG. 1 is a functional block diagram of an exemplary diesel engine system that includes a diesel particular filter (DPF) system according to the present invention.

Referring now to FIG. 1, an exemplary diesel engine system 10 is schematically illustrated in accordance with the present Invention. It is appreciated that the diesel engine system 10 is merely exemplary in nature and that the diesel backpressure (BP) compensation strategy described herein can be implemented in various diesel engine systems using a diesel particulate filter (DPF).

The diesel engine system 10 includes a diesel engine 12, an intake manifold 14 and an exhaust system 18. The engine 12 combusts an air/fuel mixture within cylinders (not shown) to drive pistons (not shown) that rotatably drive a crankshaft (not shown). Exhaust from the combustion process is exhausted from the cylinders and into the exhaust manifold 16.

Air is drawn through a throttle 16 into the intake manifold 14, which distributes air to the cylinders. Fuel is injected into cylinders by the common rail injection system (not shown)

and the heat of the compressed air ignites the air/fuel mixture. The exhaust gas exits from the cylinders into the exhaust system 18. The diesel engine system 10 can include a variable geometry turbo (VGT) 26 that pumps additional air into the cylinders for combustion with the fuel and air drawn in from the intake manifold 14.

The exhaust system 18 includes an exhaust manifold 30, an exhaust conduit 31, an exhaust gas recirculation (EGR) valve 34, an EGR conduit 35, an EGR cooler 36, a catalyst 38, and a DPF 40. The exhaust manifolds 28, 30 direct the exhaust segments from the cylinders into the exhaust conduits 29, 31. The EGR valve 34 re-circulates a portion of the exhaust through the EGR conduit 35, as explained in further detail below. The remainder of the exhaust is directed into the VGT 26 to drive the VGT 26. A combined exhaust stream flows from the VGT 26 through the catalyst 38 and the DPF 40. The DPF 40 filters particulates from the combined exhaust stream as it flows to the atmosphere.

An engine control module (ECM) 42 regulates operation of the diesel engine system 10 according to the engine BP compensation system of the present invention. More particularly, the ECM 42 communicates with an intake manifold absolute pressure (MAP) sensor 44, an engine speed sensor 46, a mass air flow (MAF) sensor 48, and a BP sensor 49. The MAP sensor 44 generates a signal indicating the boost and the engine speed sensor 46 generates a signal indicating engine speed (RPM). The MAF sensor 48 generates a signal indicating the MAF into the intake manifold 14 and the BP sensor 48 generates a signal indicating the BP across the DPF 40. The ECM 42 determines an engine load or engine operating point based in part on the RPM and fueling rates of the engine 12. The fueling rate is generally measured in fuel volume per combustion event. Engine output is controlled via the fueling rate.

The ECM 42 determines an EGR rate based on engine load. For example, during periods of heavy engine load, the EGR rate is reduced to enable increased oxygen for combustion within the cylinders. During periods of low engine load, the EGR rate is increased to reduce oxygen intake into the cylinders, which reduces cylinder temperature and emissions. The EGR rate can vary from 0% to over 50%. More specifically, the EGR rate reflects the amount of re-circulated exhaust. For example, an EGR rate of 20% recirculates 20% of the total amount of exhaust generated.

The ECM 42 controls the VGT 26 and the EGR valve 34 to achieve the desired boost and EGR rate according to the BP compensation system of the present invention. The percentage increase in BP measured by the BP sensor 49 can be translated into to a percentage increase in boost. As discussed in detail below, the vanes of the VGT 26 are closed to compensate for the loss of fresh MAF and boost. Closure of the VGT 26 vanes ceases when the ECM 42 determines that the rate of change boost has begun to decrease, which avoids unnecessary over closure of the VGT 26 vanes and/or increase in turbo speed.

As discussed in further detail below, if the percent improvement in boost due to the closure of VGT 26 vanes does not meet the need based on the percentage increase in BP measured by the BP sensor 49, and the ECM 42 has stopped further closure of the VGT 26 vanes, the MAF can be increased to meet the percentage increase in BR. Closure of the EGR valve 34 results in an increase in MAF.

Figure 2:
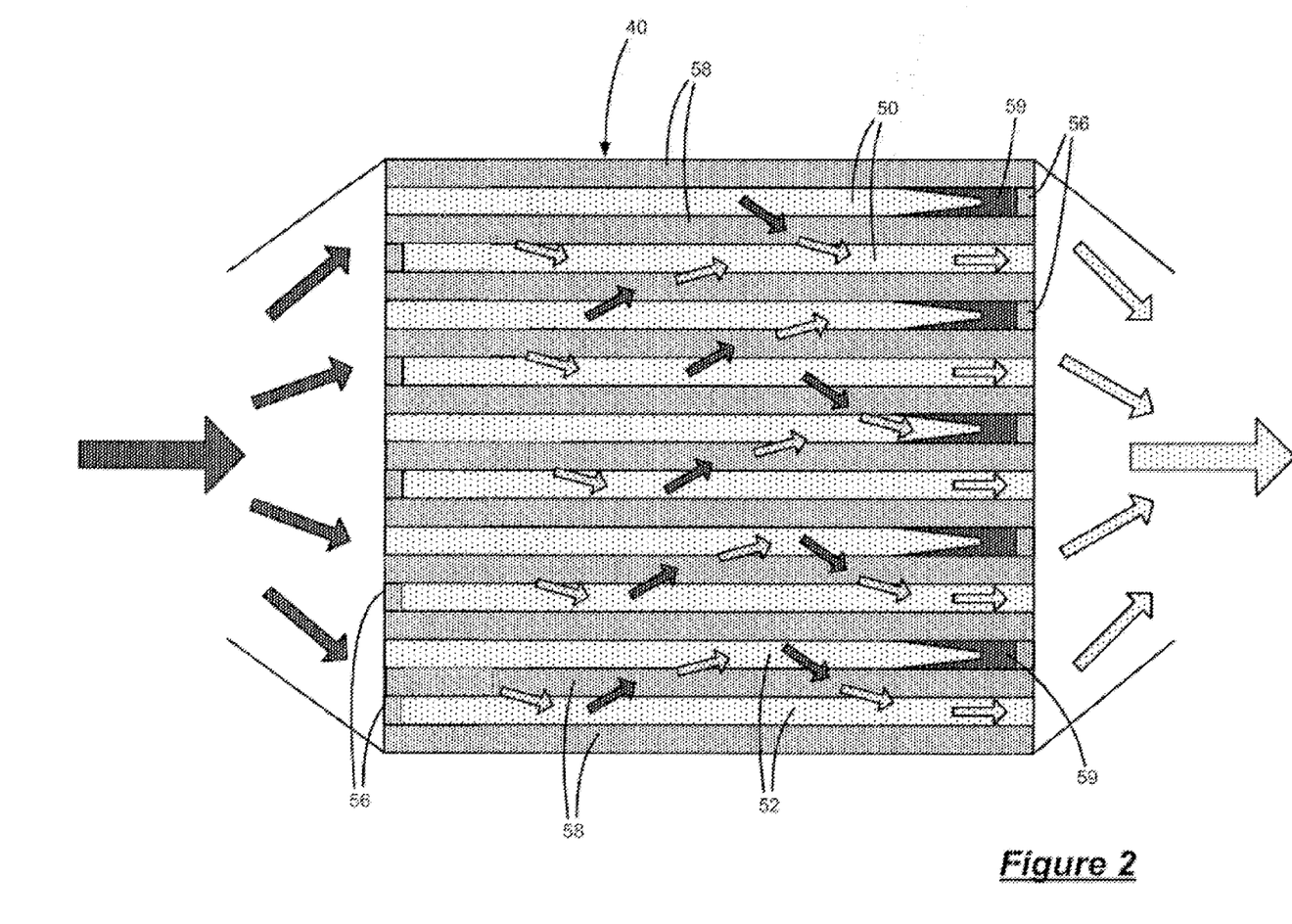
FIG. 2 is a schematic cross-sectional view of a DPF.

With particular reference to FIG. 2, the DPF 40 is a particulate trap and includes alternating closed cells/channels 50 and open cells/channels 52. Exhaust gases, such as those generated by the engine 12 enter the closed channels 50. Particulate matter 54 is deposited within the closed channels 50 and the exhaust exits through the open channels 52. Plugs 56 are used to seal the ends of the channels 50, 52. Walls 58 of the DPF 40 are preferably comprised of a porous ceramic honeycomb wait of chordierite material. It is appreciated that any ceramic comb material is considered within the scope of the present invention. Soot particles 59 flow into the DPF 40 and are trapped therein resulting in BP across the DPF 40.

Figure 3:
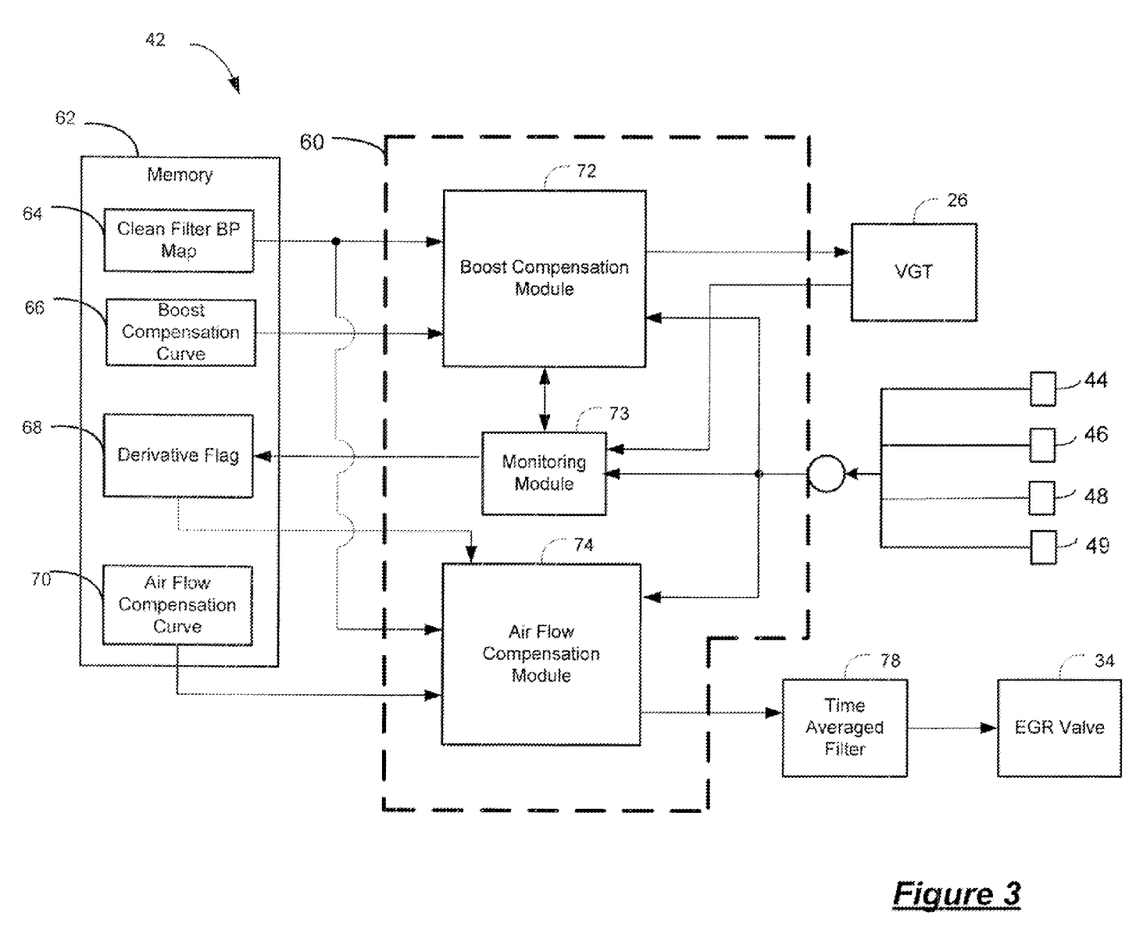
FIG. 3 is a block diagram depicting a backpressure compensation system in accordance with the present invention.

Referring now to FIG. 3, the ECM 42 includes memory 62 that stores information such as reference BP values for various engine operating points on a clean filter BP map 64, a boost compensation (BC) curve 66, a derivative flag 68, and an air flow compensation (AFC) curve 70. The ECM also includes a BP compensation system 60 that adjusts the vanes of a VGT 26 using a clean filter BP map 64 and a user-defined BC curve 66. The BP compensation system 60 also adjusts the position of the EGR valve 34 using the clean filter BP map 64 and a user-defined AFC curve 70.

The BP compensation system 60 includes monitoring and transmitting signals received from the MAP sensor 44, the engine speed sensor 46, the MAF 48, and the BP sensor 49, A BC module 72 periodically reads the BP across the DPF 40 over a predetermined time interval and calculates a first time averaged value of the BP across the DPF 40. The BC module 72 then calculates a ratio of the time averaged value of BP experienced by the DPF 40 with respect to a reference sea level BP value of a clean DPF 40. The reference sea level BP value of a clean DPF 40 is read from a clean filter BP map 64 at a first engine operating point. If the ratio is greater than one, the BC module 72 reads a BC curve 66 to determine a BC factor. After a second predetermined time interval in which the BC module 72 has stored several BC factor values, the BC module 72 calculates an averaged BC factor and accordingly begins to gradually close the vane mechanism of the VGT 26.

A monitoring module 73 determines the rate of change of boost relative to the change in position of the vanes of the VGT 26. If the rate of change of boost begins to decreases with continued closure of the vanes of the VGT 26, the derivative flag 68 is set and further vane closure of VGT 26 is ceased.

An AFC module 74 periodically reads the BP across the DPF 40 and determines a second time averaged value of the BP across the DPF 40. In an exemplary embodiment, the AFC module 74 may begin operation when the derivative flag 68 is set. The ARC module 74 then calculates a ratio of the time averaged value of BP experienced by the DPF 40 with respect to a reference sea level BP value of a clean DPF 40. The reference sea level BP value of a clean DPF 40 is read from a clean filter BP map 64 at a second engine operating point.

The AFC module 74 reads an AFC curve 66 to determine an AFC factor. After a predetermined time interval in which the AFC module 74 has stored several AFC factor values, the AFC module 74 calculates an averaged AFC factor and, accordingly, adjusts the position of the EGR valve 34. The time averaged filter 78 controls the EGR valve 34 position and prevents the ER valve 34 from experiencing unanticipated changes in position.

Figure 4A:
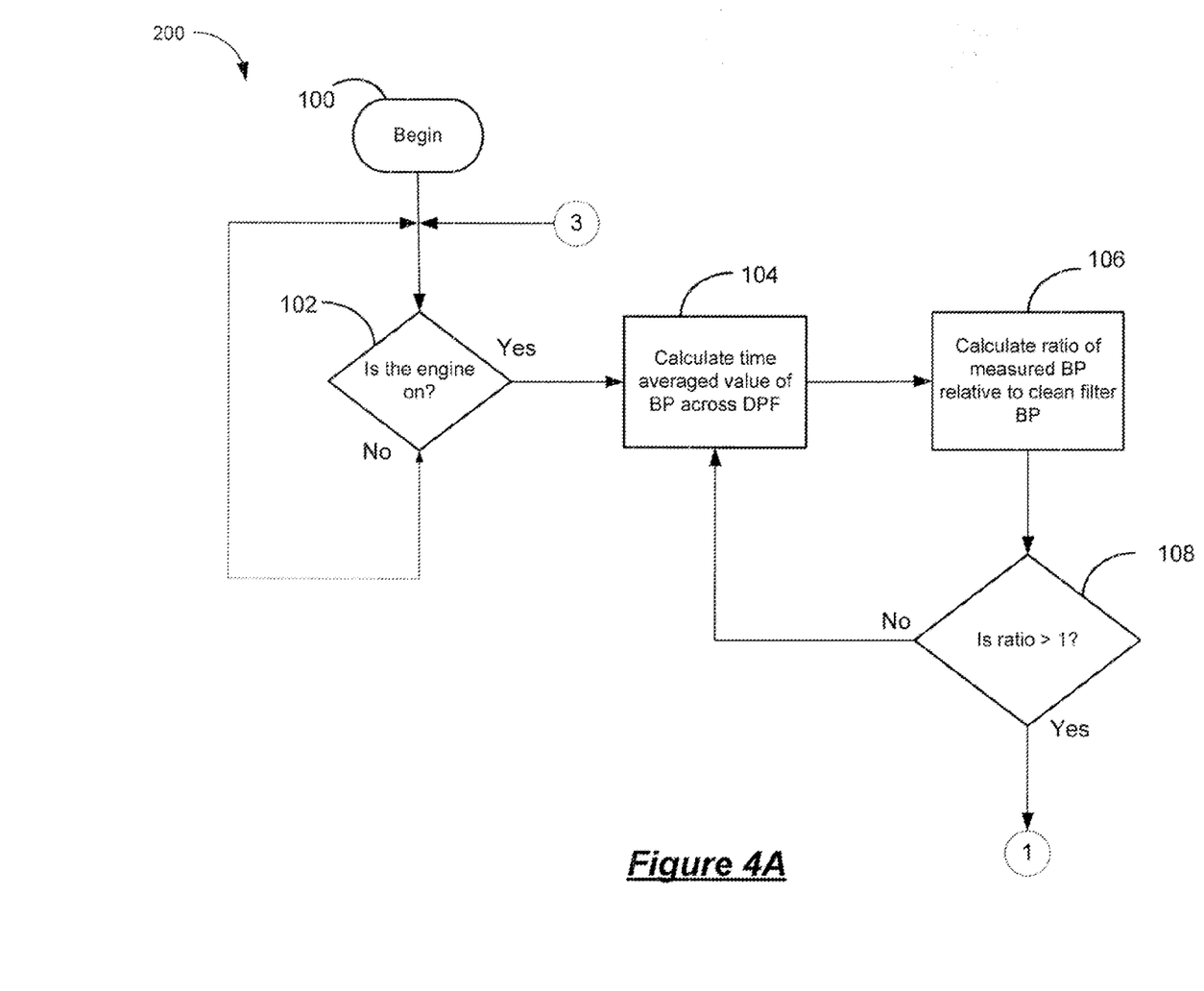
FIG. 4 is a flowchart illustrating exemplary steps executed by a backpressure compensation system according to the present invention.
Figure 4B:
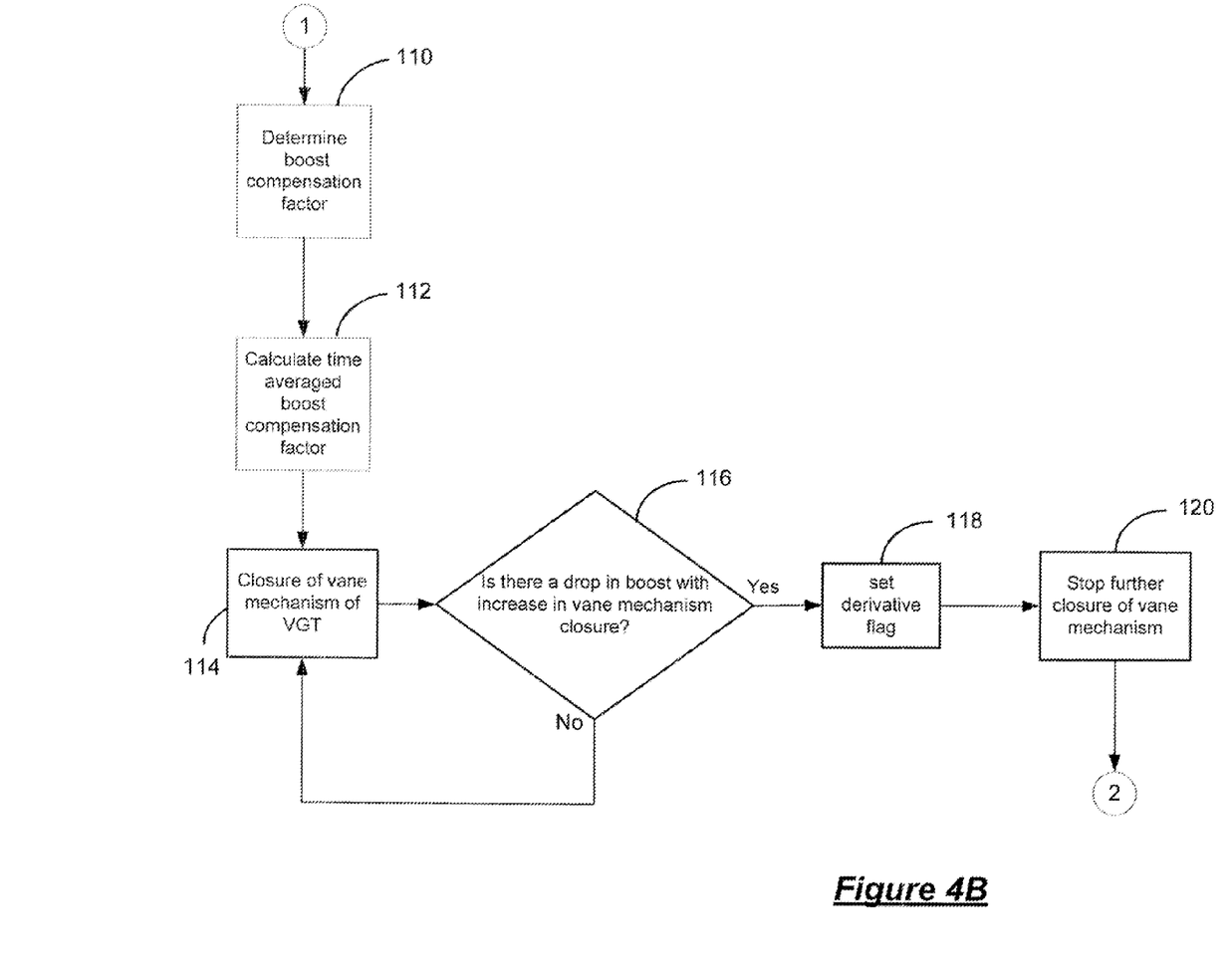
Figure 4C:
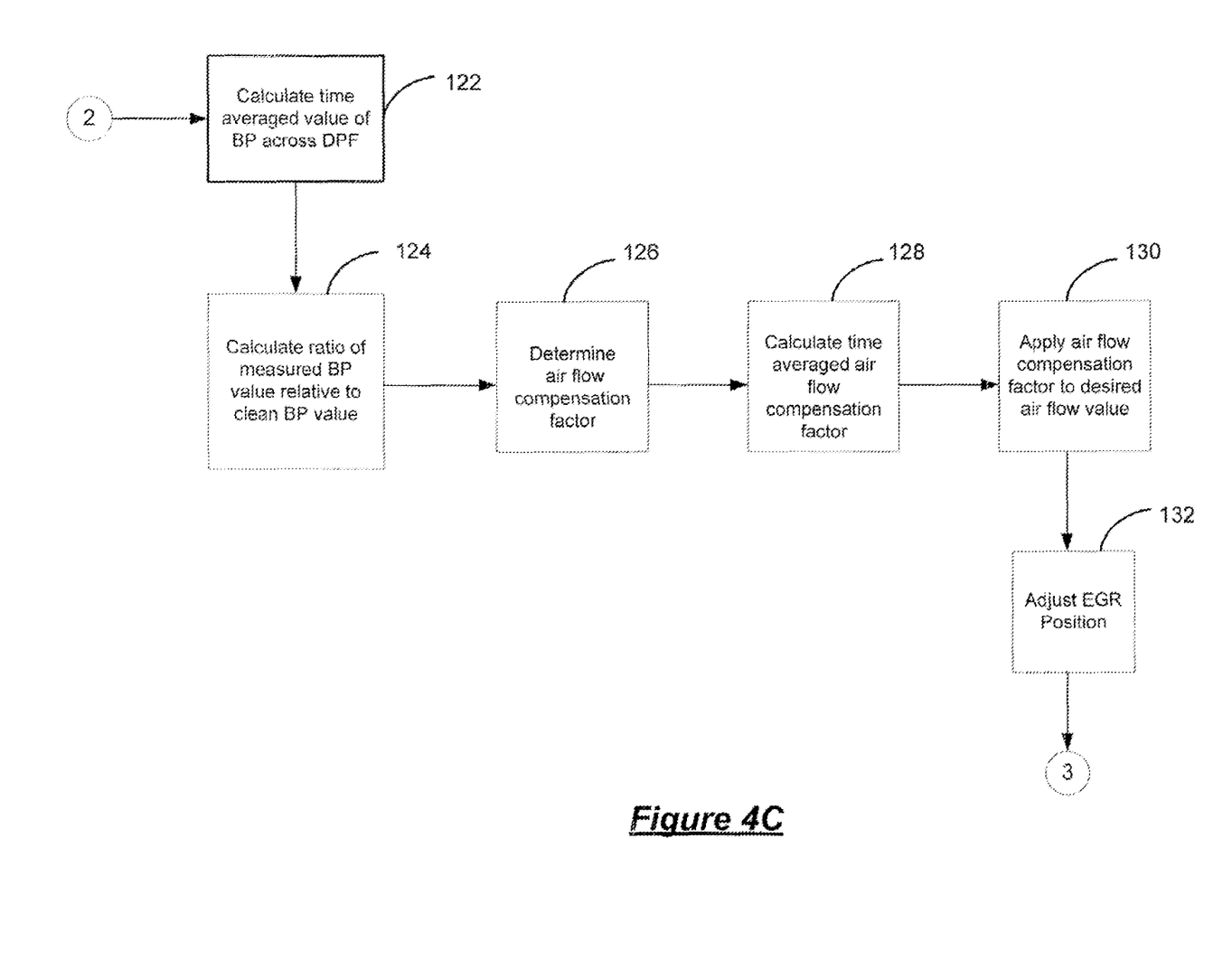

Referring now to FIG. 4, the BP compensation system 60 will be described in further detail. The BP compensation system 60 implements a method generally identified at 200 to control the vane position of a VGT 26 and an EGR valve 34. The method starts at step 100. In step 102 if the engine is turned on, the ECM 42 will be operational and proceed to step 104. If the engine is not turned on, the ECM 42 will not be operational and the BP compensation system 60 will not be initiated. In step 104, the BC module 76 determines an average value of the BP experienced by the DPF 40 over a period of time. In step 106, the BC module 76 determines the ratio of the average value of BP experienced by the DPF 40 with respect to the reference sea level BP value of a clean DPF 40 at a first engine operating point. In step 108, the BC module 76 determines whether the ratio is greater than 1. If the ratio is not greater than 1, the BP compensation system 60 returns to step 104. If the ratio is greater than 1, the BP compensation system 60 continues in step 110.

In step 110, the BC module 76 uses the ratio calculated in step 108 to determine a BC factor for the full engine map from a user-defined BC curve 66 stored in the memory 62 of the ECM 42. In step 112, the BC module 76 determines the average value of the BC factor over a period of time.

In step 114, the vane mechanism of the VGT 26 begins to close to compensate for the loss of fresh MAF and boost due to the increase in BP experienced by the DPF 40. In step 116, the monitoring module 73 determines whether the engine 12 experiences a decrease in the rate of change in boost with respect to an increase in closure of the vane mechanism of the VGT 26. If the engine 12 does not experience a decrease in the rate of change in boost, the BP compensation system 60 returns to step 114. If the engine does experience a decrease in the rate of change in boost, the BP compensation system 60 continues to step 118.

In step 118, the monitoring module 73 sets the derivative flag 68. The monitoring module 73 monitors the rate of change of boost with respect to the closure of the vane mechanism of the VGT 26. In step 120, the BC module 76 stops further closure of the vane mechanism of the VGT 26.

In step 122, the AFC module 74 calculates an average value of the BP experienced by the DPF 40 over a period of time. In step 124, the ARC module 74 determines the ratio of the average value of BP experienced by the DPF 40 with respect to the average value of the reference sea level BP of a clean DPF 40 at a second engine operating point. In step 126 the AFC module 74 uses the ratio calculated in step 122 to determine an ARC factor for the full engine map from a user-defined AFC curve 70 stored in the memory 62 of the ECM 42.

In step 128, the AFC module 74 calculates the average value of the AFC factor over a period of time. In an exemplary embodiment, the maximum period of time in calculating the average value of the AFC factor cannot exceed the time needed for DPF 40 regeneration. In step 130, the EGR valve 34 is adjusted according to the average value of the AFC factor determined in step 128.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system that compensates for changes in backpressure (BP) of an engine, comprising:
    a pressure sensor that senses said BP; and
    a boost compensation (BC) module that communicates with said pressure sensor, that determines a first BP ratio based on a first averaged BP value relative to a first reference BP value at a first engine operating point, that determines a BC factor based on said first BP ratio, that determines an averaged BC factor based on said BC factor and at least one additional BC factor, and that adjusts a variable geometry turbo (VGT) based on said averaged BC factor.

2. The control system of claim 1 further comprising:
    an air flow compensation (AFC) module that determines an averaged AFC factor and adjusts an exhaust gas recirculation (EGR) valve based on said averaged AFC factor.

3. The control system of claim 1 further comprising:
    a monitoring module that controls said VGT based on a compensation ratio that represents a rate of change of intake manifold pressure relative to rate of change of vane position of said VGT.

4. The control system of claim 3 wherein said monitoring module commands said BC module to stop adjusting said VGT when said compensation ratio begins to decrease.

5. The control system of claim 2 wherein said AFC module determines an AFC factor based on a second BP ratio and a second engine operation point.

6. The control system of claim 5 wherein said AFC module calculates said second BP ratio based on a second averaged BP value relative to a second reference BP value at said second engine operation point and determines said averaged AFC factor based on said AFC factor and at least one additional AFC factor.

7. The control system of claim 6 wherein said first reference BP value and said second reference BP value are determined from a reference BP diesel particulate filter table, said BC factor is determined from a BC curve, and said AFC factor is determined from an AFC curve.

8. The control system of claim 7 wherein said BC curve and said AFC curve can be calibrated.

9. The control system of claim 3, further comprising:
    a time averaged filter that controls positioning of said EGR valve.

10. The control system of claim 1 wherein said control system ceases operation when a diesel particulate filter switches to a regeneration mode.

11. A method for compensating for changes in backpressure (BP) of an engine, comprising:
    sensing said BP;
    determining a first BP ratio based on a first averaged BP value relative to a first reference BP value at a first engine operating point;
    determining a BC factor based on said first BP ratio;
    determining an averaged boost compensation (BC) factor based on said BC factor and at least one additional BC factor; and
    adjusting a variable geometry turbo (VGT) based on said averaged BC factor.

12. The method of claim 11 further comprising:
    determining an averaged AFC factor; and
    adjusting an exhaust gas recirculation (EGR) valve that controls recirculation of exhaust gas into an intake manifold based on said averaged AFC factor.

13. The method of claim 11 further comprising:
    controlling said VGT based on a compensation ratio, wherein said compensation ratio represents a rate of change of intake manifold pressure relative to rate of change of vane position of said VGT.

14. The method of claim 13 wherein said VGT stops being adjusted when said compensation ratio begins to decrease.

15. The method of claim 12 wherein said AFC factor is based on a second BP ratio and a second engine operation point.

16. A method for compensating for changes in backpressure (BP) of an engine, comprising:
    sensing said BP;
    determining an averaged boost compensation (BC) factor;
    adjusting a variable geometry turbo (VGT) based on said averaged BC factor;

determining an averaged air flow compensation (AFC) factor;

adjusting an exhaust gas recirculation (EGR) valve that controls recirculation of exhaust gas into an intake manifold based on said averaged AFC factor;

wherein said BC factor is based on a first BP ratio and a first engine operation point and said AFC factor is based on a second BP ratio and a second engine operation point; and wherein said first BP ratio is based on a first averaged BP value relative to a first reference sea level BP value at said first engine operation point and said second BP ratio is based on a second averaged BP value relative to a second reference sea level BP value at said second engine operation point.

17. The method of claim 16 wherein said first reference sea level BP value and said second reference sea level BP value are determined from a reference sea level BP clean diesel particulate filter table, said BC factor is determined from a BC curve, and said AFC factor is determined from an AFC curve.

18. The method of claim 17 wherein said BC curve and said AFC curve can be calibrated.

19. The method of claim 13 further comprising:
controlling positioning of said EGR valve with a time average filter mechanism.

20. The method of claim 11 wherein said method ceases operation when a diesel particulate filter switches to a regeneration mode.

* * * * *

UNITED STATES PATENT AND TRADEMARK OFFICE
CERTIFICATE OF CORRECTION

PATENT NO.       : 7,637,107 B2                          Page 1 of 1
APPLICATION NO.  : 11/459382
DATED            : December 29, 2009
INVENTOR(S)      : Ravishankar Ramamurthy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 198 days.

Signed and Sealed this

Ninth Day of November, 2010

David J. Kappos
*Director of the United States Patent and Trademark Office*